United States Patent
Huang

(10) Patent No.: US 10,560,045 B1
(45) Date of Patent: Feb. 11, 2020

(54) DRIVING DEVICE FOR MULTI-AXIS COMMON-MODE VOICE COIL MOTOR

(71) Applicant: Industrial Technology Research Institute, Hsin-Chu (TW)

(72) Inventor: Chieh-Yi Huang, Hsinchu County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 0 days.

(21) Appl. No.: 16/225,424

(22) Filed: Dec. 19, 2018

(30) Foreign Application Priority Data

Nov. 8, 2018 (TW) .............................. 107139617 A

(51) Int. Cl.
*H02P 25/034* (2016.01)
*H02P 6/28* (2016.01)
*G05F 1/445* (2006.01)

(52) U.S. Cl.
CPC .............. *H02P 25/034* (2016.02); *H02P 6/28* (2016.02); *G05F 1/445* (2013.01)

(58) Field of Classification Search
CPC ...... H02P 1/00; H02P 1/04; H02P 1/16; H02P 1/163; H02P 1/24; H02P 1/26; H02P 1/42;

(Continued)

(56) References Cited

U.S. PATENT DOCUMENTS

| 6,674,257 B2 | 1/2004 | Xi |
| 6,714,491 B1 | 3/2004 | Ke et al. |

(Continued)

FOREIGN PATENT DOCUMENTS

| CN | 101626218 A | 1/2010 |
| CN | 207460046 U | 6/2018 |

(Continued)

OTHER PUBLICATIONS

Jhih-Da Hsu et al., "Design and Implementation of a Voice-Coil Motor Servo Control IC for Auto-Focus Mobile Camera Applications", 2007, pp. 1357-1362, IEEE.

(Continued)

*Primary Examiner* — Antony M Paul
(74) *Attorney, Agent, or Firm* — WPAT, PC

(57) ABSTRACT

A driving device for multi-axis common-mode voice coil motor is provided, which includes a control signal processing interface and a plurality of drive-stage circuits. The control signal processing interface generates a plurality of control signals and a plurality of command signals. The drive-stage circuits receive the control signals and the command signals respectively; each of the drive-stage circuits is connected to one end of one of the coils of a voice coil motor and includes a half-bridge switch circuit; the drive-stage circuit controls the half-bridge switch circuit to generate a driving current to drive the coil according to the control signal. The drive-stage circuit compares the feedback signal of the feedback elements of the coil loop with the command signal to generate an adjustment signal and adjusts the driving current according to the adjustment signal, such that the driving current can track the command signal.

9 Claims, 4 Drawing Sheets

(58) Field of Classification Search
CPC .. H02P 1/423; H02P 1/46; H02P 1/465; H02P 3/00; H02P 3/24; H02P 5/00; H02P 6/00; H02P 6/002; H02P 6/003; H02P 6/006; H02P 6/008; H02P 7/00; H02P 7/0044; H02P 7/0066; H02P 7/29; H02P 8/00; H02P 21/00; H02P 23/00; H02P 27/00; H02P 6/14; H02P 25/06; H02P 25/028
USPC .... 318/34, 135, 400.01, 700, 701, 727, 799, 318/599, 811, 590, 400.29; 360/264.7, 360/266.4; 310/12.16
See application file for complete search history.

(56) References Cited

U.S. PATENT DOCUMENTS

| | | | |
|---|---|---|---|
| 6,804,131 B2 | 10/2004 | Galbiati et al. | |
| 7,542,262 B2* | 6/2009 | Galbiati | G11B 5/022 361/139 |
| 8,207,695 B2* | 6/2012 | Galbiati | H02M 7/53871 318/400.02 |
| 9,906,181 B2* | 2/2018 | Kang | H02K 41/0354 |
| 2008/0265822 A1* | 10/2008 | Menegoli | H02P 7/29 318/569 |
| 2013/0300336 A1 | 11/2013 | Ishikawa et al. | |
| 2016/0315573 A1 | 10/2016 | Kang | |

FOREIGN PATENT DOCUMENTS

| | | |
|---|---|---|
| TW | 201618451 A | 5/2016 |
| TW | I610532 | 1/2018 |
| TW | I620413 | 4/2018 |
| TW | 201817154 A | 5/2018 |

OTHER PUBLICATIONS

William McMahan et al., "Dynamic Modeling and Control of Voice-Coil Actuators for High-Fidelity Display of Haptic Vibrations", 2014, pp. 115-122, IEEE.

Kemao Peng et al., "Modeling and compensation of nonlinearities and friction in a micro hard disk drive servo system with nonlinear feedback control", Sep. 2005, pp. 708-721, vol. 13, No. 5, IEEE Transactions on Control Systems Technology.

Norbert C. Cheung et al., "Modelling and control of a high speed, long travel, dual voice coil actuator", 1997, IEEE.

Michail Vasiladiotis et al., "Modular Converter Architecture for Medium Voltage Ultra Fast EV Charging Stations Dual Half-Bridge-based Isolation Stage", 2014, pp. 1386-1393, IEEE, International Power Electronics Conference.

X.M.Feng et al., "The Technology and Application of Voice Coil Actuator", 2011, pp. 892-895, IEEE.

Ming-Tsan Peng et al., "Optimization of the Lens Holder and Yoke for a Near-Field Optical Pickup Actuator to Enhance Frequency Response", Feb. 2007, pp. 793-795, vol. 43, No. 2, IEEE Transactions on Magnetics.

Ziyin Chen et al., "Servo Control of VCM Driven Pointing Mirror Based on Command Filtered Adaptive Backstepping", Aug. 2016, pp. 1056-1061, Proceedings of the IEEE International Conference on Information and Automation.

J.-K. Seok et al., "VCM controller design with enhanced disturbance decoupling for precise automated manufacturing processes", Received on Mar. 22, 2011 Revised on Oct. 3, 2011, pp. 575-582, vol. 6, Iss. 8, IET Electr. Power Appl., 2012.

TW OA dated Jun. 17, 2019.

* cited by examiner

US 10,560,045 B1

DRIVING DEVICE FOR MULTI-AXIS COMMON-MODE VOICE COIL MOTOR

CROSS REFERENCE TO RELATED APPLICATION

All related applications are incorporated by reference. The present application is based on, and claims priority from, Taiwan Application Serial Number 107139617, filed on Nov. 8, 2018, the disclosure of which is hereby incorporated by reference herein in its entirety.

TECHNICAL FIELD

The technical field relates to a driving device. The technical field further relates to a driving device for multi-axis common-mode voice coil motor.

BACKGROUND

Voice coil motors are the devices capable of transferring electric energy to mechanical energy. Voice coil motors have a lot of advantages, including being light in weight, of low cost, of high bandwidth, of high precision, etc. Therefore, voice coil motors have been comprehensively applied to various electronic devices, such as digital cameras, smartphones, notebook computers, hard disks, etc.

The design of voice coil motor driving devices plays an important role in order to effectively drive voice coil motors to optimize the performance thereof. Currently, various novel voice coil motors driving devices have been developed so as to realize the above object.

SUMMARY

An embodiment of the present disclosure relates to a driving device for multi-axis common-mode voice coil motor, which includes a control signal processing interface and a plurality of drive-stage circuits. The control signal processing interface generates a plurality of control signals and a plurality of command signals. The drive-stage circuits receive the control signals and the command signals respectively; each of the drive-stage circuits is connected to one end of one of coils of a voice coil motor and includes a half-bridge switch circuit; the drive-stage circuit controls the half-bridge switch circuit to generate a driving current to drive the coil according to the control signal. The drive-stage circuit implements a current feedback mechanism to compare the feedback signal of the driving current for driving the coil with the command signal to generate an adjustment signal and adjusts the driving current according to the adjustment signal, whereby the driving current can track the command signal.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
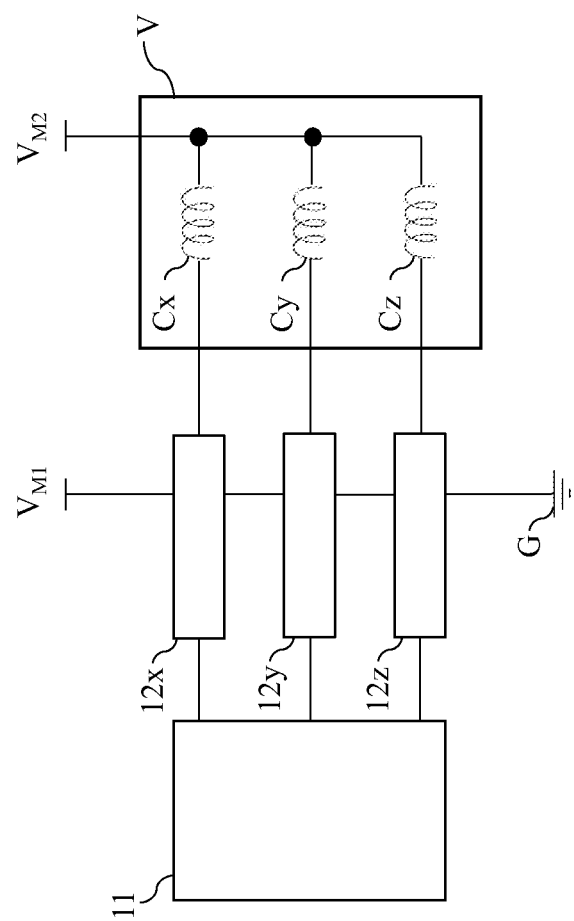
FIG. 1 is a circuit diagram of a driving device for multi-axis common-mode voice coil motor of a first embodiment in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a circuit diagram of a driving device for multi-axis common-mode voice coil motor of a first embodiment in accordance with the present disclosure. As shown in FIG. 1, the driving device 1 is connected to a multi-axis voice coil motor V, and includes a control signal processing interface 11, a plurality of drive-stage circuits 12x, 12y, 12z, a first voltage source $V_{M1}$ and a second voltage source $V_{M2}$.

The drive-stage circuits 12x, 12y, 12z are connected to the control signal processing interface 11. Besides, the drive-stage circuit 12x is connected to one end of the x-axis coil Cx of the voice coil motor V; the drive-stage circuit 12y is connected to one end of the y-axis coil Cy of the voice coil motor V; the drive-stage circuit 12z is connected to one end of the z-axis coil Cz of the voice coil motor V.

The first voltage source $V_{M1}$ is connected to the drive-stage circuits 12x, 12y, 12z.

The other end of the x-axis coil Cx, the other end of the y-axis coil Cy and the other end of the z-axis coil Cz are connected to a common end; the second voltage source $V_{M2}$ is also connected to the common end. In one embodiment, the voltage of the second voltage source $V_{M2}$ is less than the voltage of the first voltage source $V_{M1}$. In another embodiment, the voltage of the second voltage source $V_{M2}$ is about half of the voltage of the first voltage source $V_{M1}$.

The control signal processing interface 11 generates a plurality of control signals CS and a plurality of command signals OS to drive the drive-stage circuits 12x, 12y, 12z respectively. The embodiment takes the drive-stage circuit 12x as an example, so only the control signal CS and the command signal OS inputted into the drive-stage circuit 12x are shown in FIG. 1.

The drive-stage circuits 12x, 12y, 12z receive the control signals CS and the command signals OS respectively. Then, the drive-stage circuits 12x, 12y, 12z can respectively drive the x-axis coil Cx, the y-axis coil Cy and the z-axis coil Cz via half-bridge switch mechanism. Take the drive-stage circuits 12x as an example, the drive-stage circuits 12x includes a half-bridge switch circuit; the drive-stage circuits 12x controls the half-bridge switch elements to generate a driving current for driving the x-axis coil Cx. Then, the drive-stage circuits 12x compares the feedback signal of the current feedback elements in the current loop with the command signal OS to generate an adjustment signal; in one embodiment, the adjustment signal may be a pulse width modulation (PWM) signal.

Afterward, the half-bridge switch elements of the drive-stage circuit Cx adjust the driving current for driving the x-axis coil Cx. In this way, the driving current of the x-axis coil Cx can effectively track the command signal OS so as to realize dual-direction driving current control for multi-axis common-mode voice coil motors.

As described above, the driving device 1 realizes special circuit design and operation mechanism via the drive-stage circuits 12x, 12y, 12z, such that the driving device 1 can drive the common-mode voice coil motor V and realize dual-direction driving current control for all axes of the voice coil motor V.

The embodiment just exemplifies the present disclosure and is not intended to limit the scope of the present disclosure. Any equivalent modification and variation according to the spirit of the present disclosure is to be also included within the scope of the following claims and their equivalents.

Figure 2:
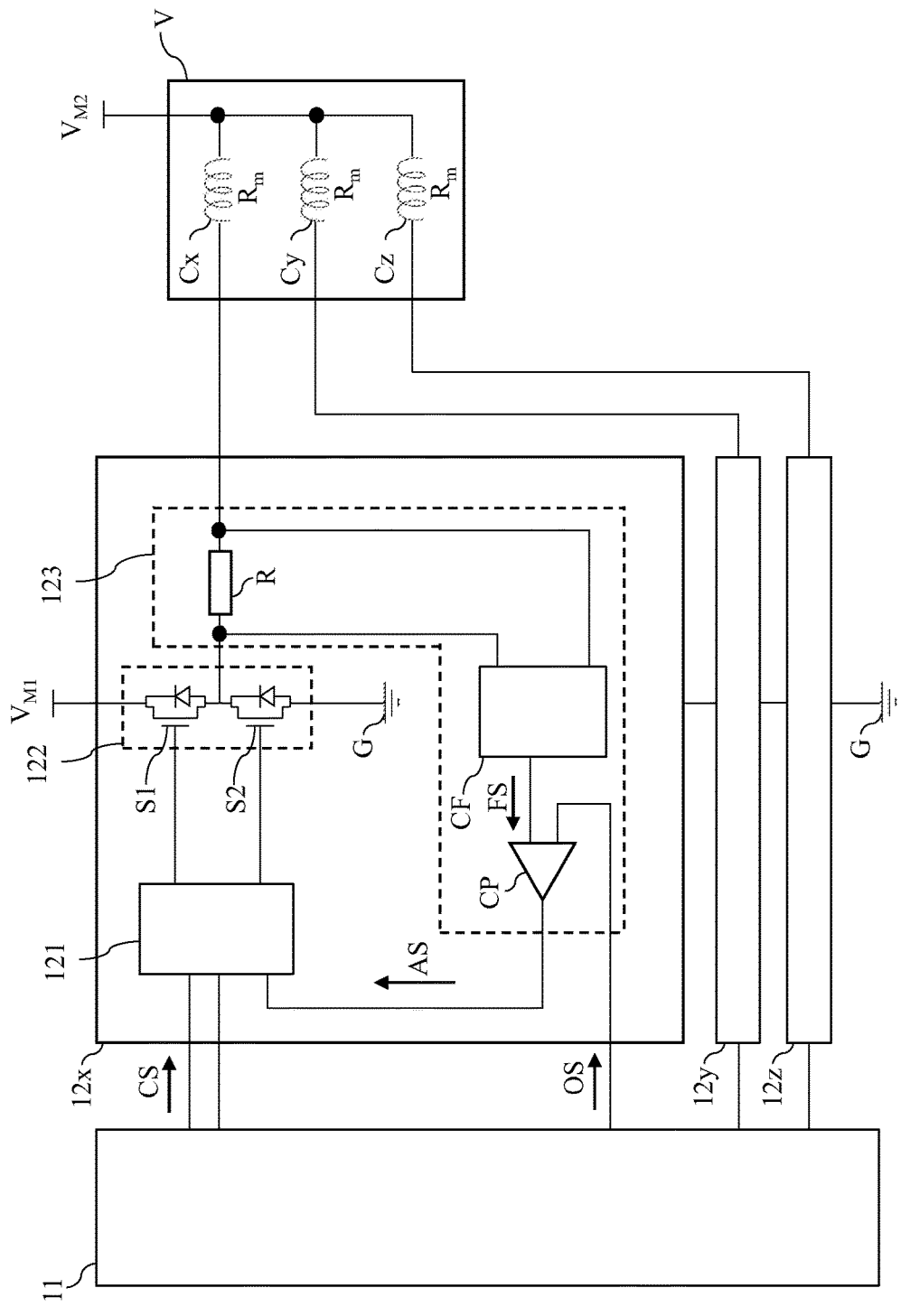
FIG. 2 is a circuit diagram of a driving device for multi-axis common-mode voice coil motor of a second embodiment in accordance with the present disclosure.
Figure 3:
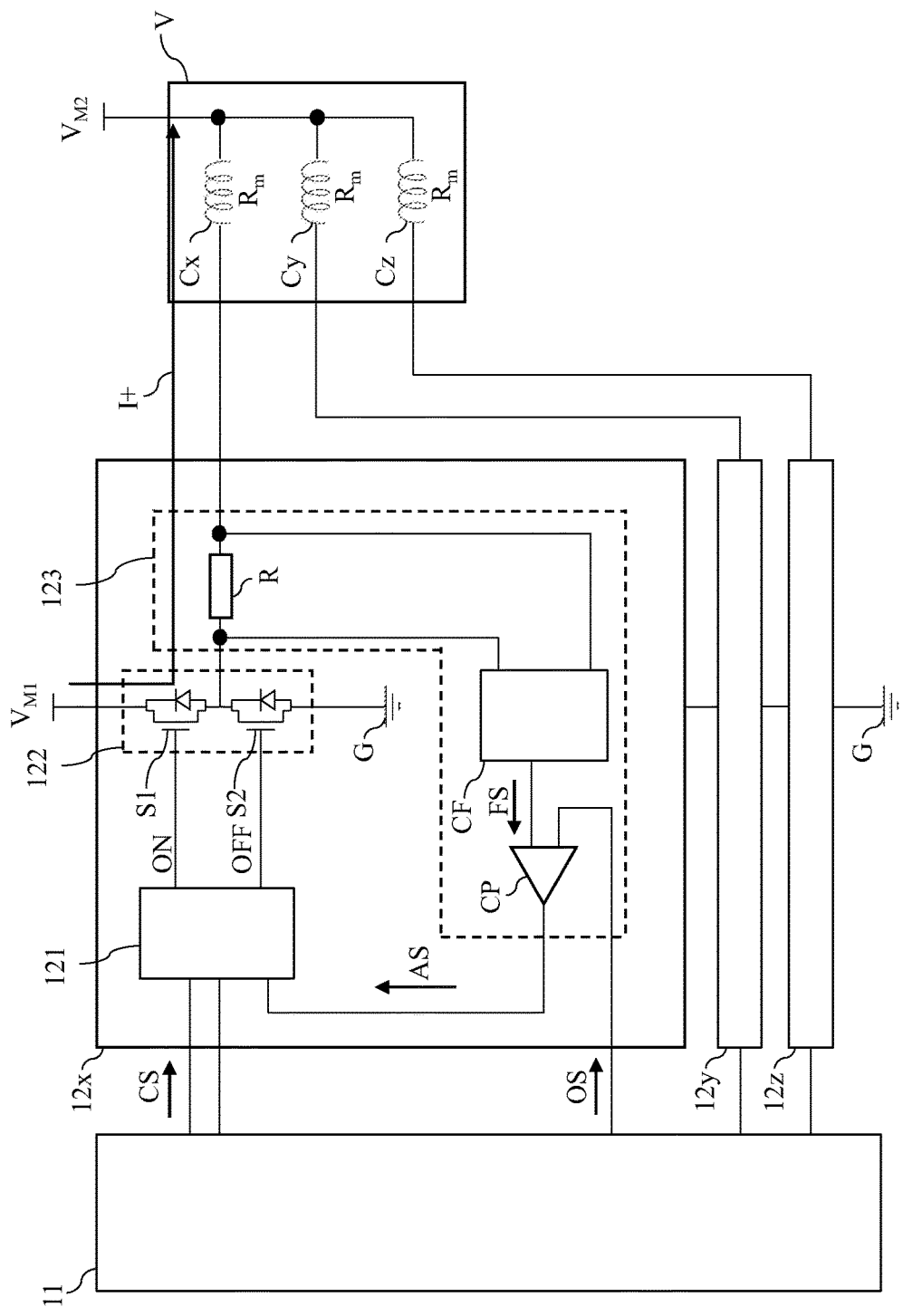
FIG. 3 is a first schematic view of the operation status of the driving device for multi-axis common-mode voice coil motor of the second embodiment in accordance with the present disclosure.
Figure 4:
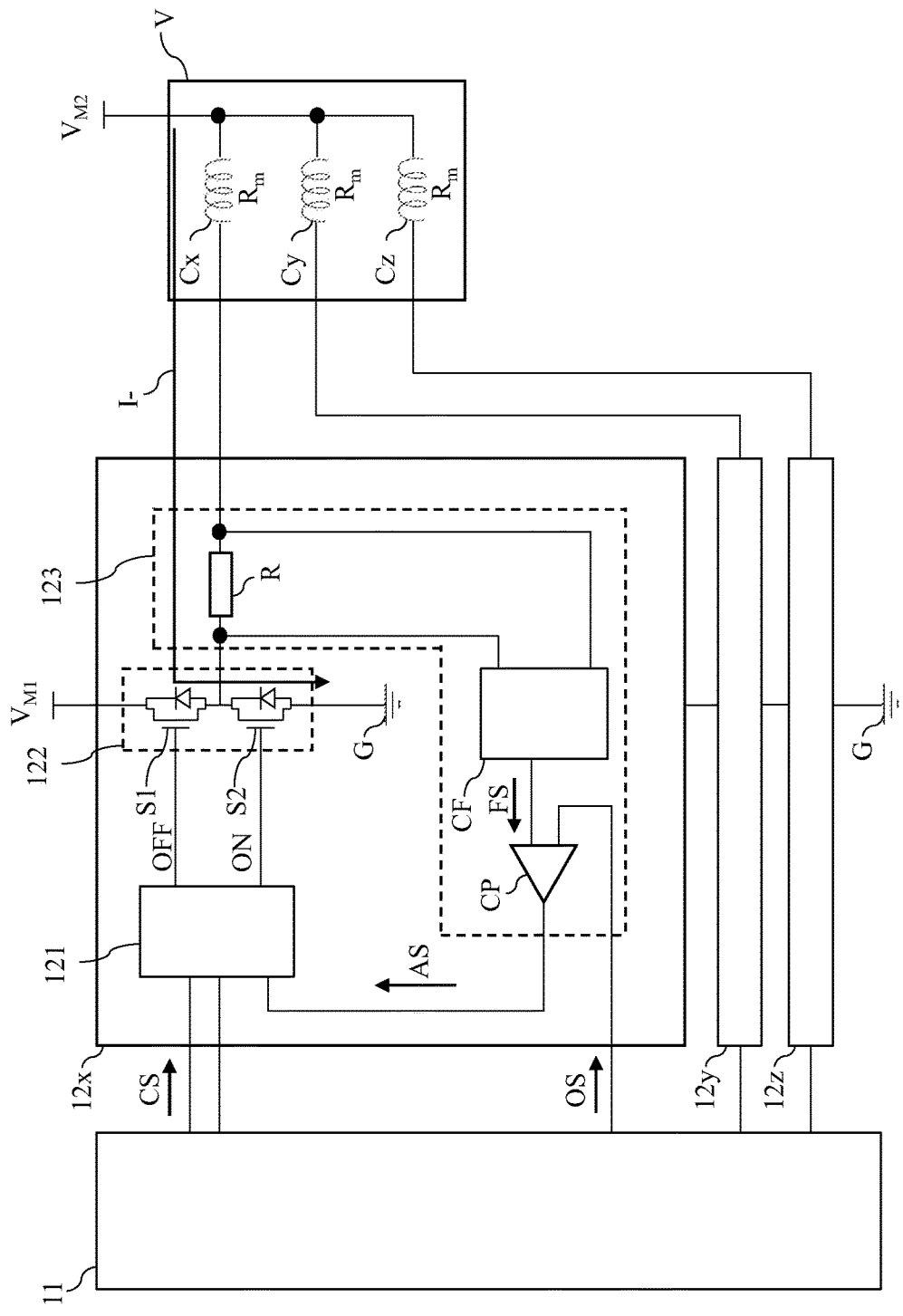
FIG. 4 is a second schematic view of the operation status of the driving device for multi-axis common-mode voice coil motor of the second embodiment in accordance with the present disclosure.

Please refer to FIG. 2, FIG. 3 and FIG. 4. FIG. 2 is a circuit diagram of a driving device for multi-axis common-mode voice coil motor of a second embodiment in accordance with the present disclosure. FIG. 3 and FIG. 4 are a first schematic view and a second schematic view of the operation status of the driving device for multi-axis common-mode voice coil motor of the second embodiment in accordance with the present disclosure. As shown in FIG. 2, the driving device 1 is connected to a multi-axis voice coil motor V, and includes a control signal processing interface 11, a plurality of drive-stage circuits 12x, 12y, 12z, a first voltage source $V_{M1}$ and a second voltage source $V_{M2}$.

The drive-stage circuits 12x, 12y, 12z are connected to the control signal processing interface 11. Besides, the drive-stage circuit 12x is connected to one end of the x-axis coil Cx of the voice coil motor V; the drive-stage circuit 12y is connected to one end of the y-axis coil Cy of the voice coil motor V; the drive-stage circuit 12z is connected to one end of the z-axis coil Cz of the voice coil motor V.

The first voltage source $V_{M1}$ is connected to the drive-stage circuits 12x, 12y, 12z.

The other end of the x-axis coil Cx, the other end of the y-axis coil Cy and the other end of the z-axis coil Cz are connected to a common end; the second voltage source $V_{M2}$ is also connected to the common end. In the embodiment, the voltage of the second voltage source $V_{M2}$ is about half of the voltage of the first voltage source $V_{M1}$.

The control signal processing interface 11 generates a plurality of control signals CS and a plurality of command signals OS.

The drive-stage circuits 12x, 12y, 12z receive the control signals CS and the command signals OS respectively. As the drive-stage circuits 12x, 12y, 12z have the same circuit structure and operation mechanism, so the embodiment only describes the drive-stage circuit 12x, The drive-stage circuit 12x includes a logic control circuit 121, a half-bridge switch circuit 122 and a feedback circuit 123. The logic control circuit 121 is connected to the half-bridge switch circuit 122 and the feedback circuit 123, and the half-bridge switch circuit 122 is connected to one end of the x-axis coil Cx via the feedback circuit 123.

The logic control circuit 121 controls the half-bridge switch circuit 122 according to the control signal CS to generate a driving current to drive the x-axis coil Cx.

The half-bridge switch circuit 122 includes a first switch S1 and a second switch S2. More specifically, the first end of the first switch S is connected to the logic control circuit 121; the second end of the first switch S1 is connected to the first voltage source $V_{M1}$; the first end of the second switch S2 is connected to the logic control circuit 121; the second end of the second switch S2 is connected to the third end of the first switch S1; the third end of the second switch S2 is connected to a ground G.

The feedback circuit 123 includes a resistor R, a current feedback unit CF and a comparison unit CP. One end of the resistor R is connected to the third end of the first switch S1 and the second end of the second switch S2; the other end of the resistor R is connected to one end of the x-axis coil Cx. The current feedback unit CF is connected to the resistor R and the comparison unit CP, senses the driving current flowing into the x-axis coil Cx to generate a feedback signal FS and then inputs the feedback signal FS into one input end of the comparison unit CP. In one embodiment, the current feedback unit CF may be a differential amplifier circuit. The other input end of the comparison unit CP receives the command signal OS. Then, the comparison unit CP compares the driving current of the x-axis coil Cx with the command signal OS to generate an adjustment signal AS and inputs the adjustment signal AS into the logic control circuit 121. In one embodiment, the comparison unit CP may be a comparator.

The logic control circuit 121 controls the upper switch element and the lower switch element of the half-bridge switch circuit 122 in order to control the flow direction of the driving current of the x-axis coil Cx, such that the driving current of the x-axis coil Cx can effectively track the command signal OS so as to more effectively control the driving current.

As described above, the comparison unit CP of the feedback circuit 123 can compare the driving current of the x-axis coil Cx with the command signal OS to generate the adjustment signal AS and input the adjustment signal AS into the logic control circuit 121. As shown in FIG. 3, when the first switch S1 is on and the second switch S2 is off, the positive current I+ is outputted from the first voltage source $V_{M1}$ and flows into the x-axis coil Cx after passing through the first switch S1 and the resistor R. The positive current I+ can be expressed by Equation (1), as follows:

$$1 += \frac{V_{M1} - V_{M2}}{R_f + R_m} \qquad (1)$$

In Equation (1), I+ stands for the positive current; $R_f$ stands for the resistance of the resistor R; $R_m$ stands for the internal resistance of the x-axis coil Cx.

In this situation, if the feedback signal FS is higher than the command signal OS (i.e. the absolute value of the feedback signal FS is greater than that of the command signal OS), the comparison unit CP generates the adjustment signal AS for reducing the driving current. Accordingly, the logic control circuit 121 can turn off the first switch S1 according to the adjustment signal AS.

As shown in FIG. 4, when the first switch S1 is off and the second switch S2 is on, the negative current I− is outputted from the second voltage source $V_{M2}$ and flows into second switch S2 after passing through the x-axis coil Cx and the resistor R. The negative current I− can be expressed by Equation (2), as follows:

$$I-= \frac{V_{M2} - 0}{R_f + R_m} \quad (2)$$

In Equation (2), I− stands for the negative current; $R_f$ stands for the resistance of the resistor R; $R_m$ stands for the internal resistance of the x-axis coil Cx.

In this situation, if the feedback signal FS is lower than the command signal OS (i.e. the absolute value of the feedback signal FS is greater than that of the command signal OS), the comparison unit CP generates the adjustment signal AS for increasing the driving current. Accordingly, the logic control circuit 121 can turn off the second switch S2 according to the adjustment signal AS.

As described above, the driving device 1 for multi-axis common-mode voice coil motor can realize special driving circuit design and operation mechanism via the drive-stage circuits 12x, 12y, 12z, such that the driving device 1 can drive the common-mode voice coil motor V and achieve dual-direction driving current control.

In addition, the drive-stage circuits 12x, 12y, 12z of the driving device 1 and the common end of the x-axis coil Cx, the y-axis coil Cy, the z-axis coil Cz of the voice coil motor V are connected to the first voltage source $V_{M1}$ and the second voltage source $V_{M2}$ respectively. Besides, the voltage of the second voltage source $V_{M2}$ is half of the first voltage source $V_{M1}$. The above circuit design can balance the positive current I+ and the negative current I−, as shown in Equation (1) and Equation (2). Accordingly, the driving device 1 can more properly adjust the driving currents of the x-axis coil Cx, the y-axis coil Cy, the z-axis coil Cz of the voice coil motor V. Therefore, the driving device 1 can achieve better performance.

The embodiment just exemplifies the present disclosure and is not intended to limit the scope of the present disclosure. Any equivalent modification and variation according to the spirit of the present disclosure is to be also included within the scope of the following claims and their equivalents.

It is worthy to point out that some currently available voice coil motor driving devices cannot drive common-mode voice coil motors, so the application thereof is limited. On the contrary, according to one embodiment of the present disclosure, the driving device for multi-axis common-mode voice coil motor has special driving circuit design and operation mechanism, so can drive common-mode voice coil motors, so can be more comprehensive in application.

Besides, some currently available voice coil motor driving devices can implement only the single-direction driving control for voice coil motors. On the contrary, according to one embodiment of the present disclosure, the driving device for multi-axis common-mode voice coil motor can control and drive all coils of the voice coil motor by several drive-stage circuits via the half-bridge switch circuits so as to realize dual-direction driving current control; thus, the driving device can better the performance of the voice coil motor.

Moreover, some currently available voice coil motor driving devices should continuously output the currents of the coils of the voice coil motor, which results in higher energy consumption and cannot satisfy energy-saving requirements. On the contrary, according to one embodiment of the present disclosure, the driving device for multi-axis common-mode voice coil motor can control and drive all coils of the voice coil motor by several drive-stage circuits via the half-bridge switch circuits, so the currents of the coils of the voice coil motor can track the command signals; therefore, the currents can be precisely outputted and the energy consumption can be effectively reduced, which can satisfy energy-saving requirements.

Furthermore, On the contrary, according to one embodiment of the present disclosure, the drive-stage circuits and the common end of the coils of the voice coil motor are connected to different voltage sources. Besides, the voltage of voltage source connected to the common end of the coils of the voice coil motor is half of the voltage of the voltage source connected to the drive-stage circuits. The above design allows the driving device can properly adjust the currents of the coils of the voice coil motor, so the performance of the voice coil motor can be further optimized.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A driving device for multi-axis common-mode voice coil motor, comprising:
    a control signal processing interface, configured to generate a plurality of control signals and a plurality of command signals; and
    a plurality of drive-stage circuits, configured to receive the control signals and the command signals respectively, and each of the drive-stage circuits being connected to one end of one of coils of a voice coil motor and comprising a half-bridge switch circuit, wherein the drive-stage circuit controls the half-bridge switch circuit to generate a driving current to drive the coil according to the control signal;
    wherein the drive-stage circuit implements a current feedback mechanism to compare a feedback signal of the driving current for driving the coil with the command signal to generate an adjustment signal and adjusts the driving current according to the adjustment signal, whereby the driving current tracks the command signal.
2. The driving device of claim 1, wherein each of the drive-stage circuit comprises a logic control circuit configured to control the half-bridge switch according to the control signal and the adjustment signal to generate the driving current.
3. The driving device of claim 2, wherein the half-bridge switch circuit comprises a first switch and a second switch; a first end of the first switch is connected to the logic control circuit, a second end of the first switch is connected to a first voltage source, a first end of the second switch is connected to the logic control circuit, a second end of the second switch is connected to a third end of the first switch, and a third end of the second switch is connected to a ground.
4. The driving device of claim 3, wherein each of the drive-stage circuits further comprises a feedback circuit connected to the logic control circuit, the coil, the third end of the first switch and the second end of the second switch, and configured to receive the command signal.
5. The driving device of claim 4, wherein the feedback circuit comprises a resistor, a current feedback unit and a comparison unit; the current feedback unit senses a voltage of the resistor and the comparison unit compares the voltage of the resistor and the command signal to generate the feedback signal.

6. The driving device of claim 5, wherein the current feedback unit is a differential amplifier circuit.

7. The driving device of claim 1, wherein the drive-stage circuit is connected to a first voltage source and the other end of each of the coils is a common end connected to a second voltage source.

8. The driving device of claim 7, wherein a voltage of the first voltage source is greater than a voltage of the second voltage source.

9. The driving device of claim 7, wherein a voltage of the second voltage source is a half of a voltage of the first voltage source.

* * * * *